E. F. RUSSELL.

Assignor, by mesne assignments, to E. W. VAILL.

Folding Rocking-Chair.

No. 8,471. Reissued Oct. 29, 1878.

Witnesses

Chas. H. Smith

Geo. T. Pinckney

Inventor

Edwin F. Russell.

per Lemuel W. Serrell atty.

N. PETERS, PHOTO-LITHOGRAPHER, WASHINGTON, D. C.

UNITED STATES PATENT OFFICE.

EDWIN F. RUSSELL, OF JAMAICA, VERMONT, ASSIGNOR, BY MESNE ASSIGNMENTS, TO EDWARD W. VAILL.

IMPROVEMENT IN FOLDING ROCKING-CHAIRS.

Specification forming part of Letters Patent No. 156,041, dated October 20, 1874; Reissue No. 8,471, dated October 29, 1878; application filed June 25, 1878.

*To all whom it may concern:*

Be it known that I, EDWIN F. RUSSELL, of Jamaica, in the county of Windham and State of Vermont, have invented an Improvement in Folding Rocking-Chairs, of which the following is a specification:

The object of this invention is to combine a folding-chair frame and rockers in such a manner that the chair will be very firm when in use, but will readily fold into a small compass for transportation. The front and back legs are both pivoted or hinged to the rockers. The front legs support the seat, and are prolonged upwardly to the back as arms or braces and are pivoted thereto and the back and back legs are provided with joints below the pivots that connect the back to the front legs, and the front part of the seat is sustained by a connection to the front legs and the back part of the seat is connected to the back.

Figure 1:
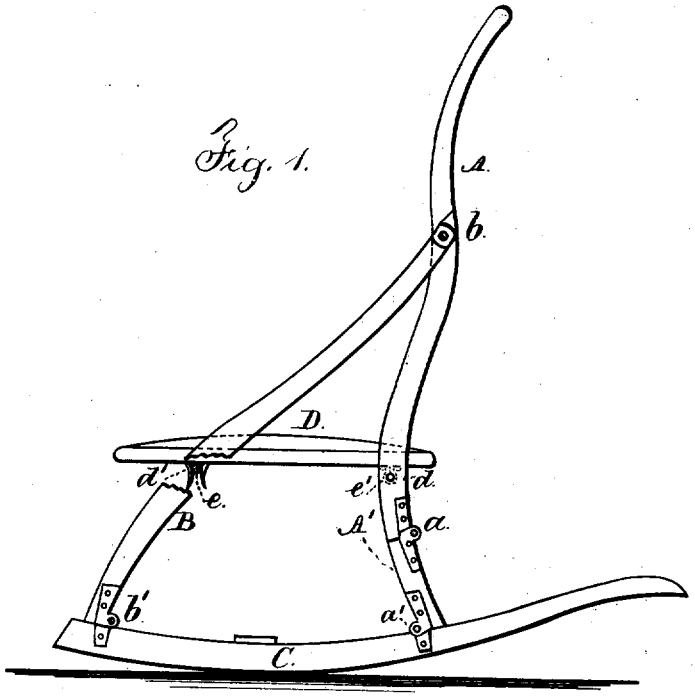
Figure 2:
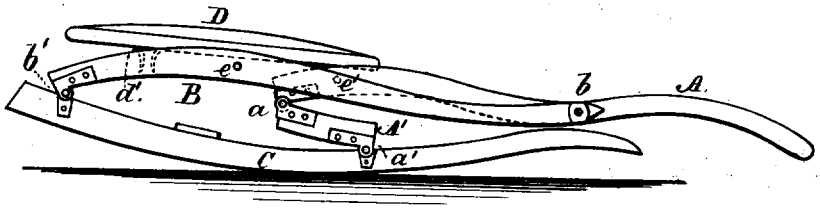

In the drawing, Figure 1 is an elevation of the chair as ready for use, and Fig. 2 shows the same as folded for transportation.

The rockers C are of ordinary character. The front legs, B, are hinged or pivoted to the rockers C at *b'*, and their upper ends pass above the seat and extend as arms or braces to the chair-back A, and are pivoted at *b*. The back legs, A', are pivoted to the rockers C at *a'*, and they are also hinged or pivoted at *a*, which allows the back and back legs to fold.

When the chair-frame is folded the portions B, that form the front legs and braces, swing upon *b'* toward the rockers, the back A turns at the pivot *b*, and the joint *a* allows the parts to close down adjacent and nearly parallel to the rockers. Fig. 2 represents this chair folded.

The seat D is of any desired character. There is a rail, *e*, across from one leg B to the other, beneath the seat, to support the same. The clips *d'* are of any convenient form for catching upon or holding the front part of the seat to the rail *e*. At *d* the back part of the seat is hinged and supported, the cross-rail *e'* serving as a pivot to eyes *d* upon the seat.

It is to be understood that in folding this chair the front of the seat is to be raised sufficiently to allow the movements of the parts, as aforesaid, and when in position for use the parts brace each other and render the chair firm.

I claim as my invention—

1. In a rocking-chair, the parts A and A' of the back, hinged together and to the rockers, in combination with braces extending from the back to the front part of the rockers and connected by pivots, which braces also form the front legs, substantially as set forth.

2. In a rocking-chair, the parts A and A' of the back, hinged together and to the rockers, in combination with braces that also form front legs, and are pivoted at their ends to the rockers and back, respectively, and a seat that is supported at the rear part by the back and the rail *e*, between the front legs, that sustains the forward portion of the seat, substantially as set forth.

3. In a folding rocking-chair, the combination, with the back and seat, of braces that are pivoted to the rockers and back, respectively, and also form front legs to sustain the forward portion of the seat, substantially as set forth.

4. The combination of the clips *d'*, cross-rail *e*, and seat D with the front legs B, back and legs A A', and rockers C, substantially as set forth.

Signed by me this 21st day of June, A. D. 1878.

E. F. RUSSELL.

Witnesses:

G. D. WAKEFIELD,

J. C. ROBINSON.